United States Patent [19]

Tworek et al.

[11] 4,309,203
[45] Jan. 5, 1982

[54] PROCESS FOR MANUFACTURING BORON NITRIDE FIBER BATTS USING A SPINNER

[75] Inventors: John L. Tworek, West Seneca; Gordon R. Rignel, Lockport, both of N.Y.

[73] Assignee: Kennecott Corporation, Stamford, Conn.

[21] Appl. No.: 134,905

[22] Filed: Mar. 28, 1980

[51] Int. Cl.³ .............................................. C03B 37/04
[52] U.S. Cl. ........................................... 65/4.1; 65/2; 65/8; 65/32; 264/8; 423/490; 428/366; 65/30.1; 65/4.3
[58] Field of Search ..................................... 65/6–8, 65/2, 4 R, 9, 32, 30 R; 423/290; 428/366; 264/8

[56] References Cited
U.S. PATENT DOCUMENTS 3,429,722   2/1969   Economy et al. ............... 423/290 X
3,668,059   6/1972   Economy et al. ............... 423/290 X
4,058,386  11/1977   Faulkner et al. ...................... 65/6

Primary Examiner—Robert L. Lindsay, Jr.
Attorney, Agent, or Firm—John L. Sniado; Anthony M. Lorusso

[57] ABSTRACT

A process is disclosed for producing non-woven, yet internally cohesive, boron nitride fiber batts, suitable for use as an electric cell separator in a lithium-sulfide battery. Molten boron oxide is centrifugally spun into strands and attenuated by an annular gas stream into fibers at a controlled relative humidity. The fibers are funnelled into a chamber and subjected to a turbulent air flow, which causes random orientation and intertwining of the fibers, resulting in multiple mechanical bonds thereamong. The compacted boron oxide fiber bundle thus produced is heated in an anhydrous ammonia atmosphere to convert boron oxide in the fibers into boron nitride (BN).

8 Claims, 2 Drawing Figures

PROCESS FOR MANUFACTURING BORON NITRIDE FIBER BATTS USING A SPINNER

BACKGROUND OF THE INVENTION

The invention relates generally to boron nitride fibers and more particularly to a process for producing integral boron nitride fiber batts.

Boron nitride (BN) possesses a number of highly desirable properties which render it useful in a wide variety of applications. Its high electrical resistivity, coupled with its high thermal conductivity, make it especially useful in electrical and electronic applications requiring a material which simultaneously acts as an electrical insulator and a thermal conductor. Its excellent thermal shock resistance renders it effective as a refractory at temperatures up to 1600° C. or higher in a nonoxidizing atmosphere and at temperatures as high as 700° to 900° C. in air. It is highly corrosion resistant, being inert to most organic liquids and many corrosive chemicals and displaying excellent resistance to attack by various molten metals. Furthermore, because of its low dissipation factor over a wide temperature range, this material is well suited for use in microwave and radar dielectric components (radar windows).

Various methods for the manufacture of boron nitride fibers are known in the prior art; for example, it is disclosed in U.S. Pat. No. 3,429,722, issued to James Economy et al., that boron nitride fibers can be manufactured by heating boron oxide fibers in an ammonia atmosphere, a process known generally as nitriding.

While it is well known in the prior art that boron nitride fibers can be manufactured having good characteristics, the use of such fibers has been limited due to difficulties in forming three dimensional articles from the fibers. U.S. Pat. No. 3,816,242 to Selover et al. teaches a process for binding BN fibers into a felt using an aqueous solution of an inorganic, water soluble material as the binder. However, almost any substance other than BN which is used to bond the fibers to each other has properties which are inferior to the properties of the boron nitride fibers, thus resulting in a bonded article which is unsuitable for use in many applications. For example, when a boron nitride fiber mat, which is bound by prior art materials, is used as an electric cell separator in a lithium sulfide battery utilizing a corrosive cell electrolyte, such as molten lithium chloride or potassium chloride, the fibers separate from each other due to the inability of the binding material to withstand the high temperature corrosive environment.

An attempt has been made prior to the present invention to form articles from boron nitride-bonded boron nitride fibers, for example, by heating boron nitride fibers impregnated with boric acid solution to elevated temperatures in ammonia as disclosed in U.S. Pat. No. 3,837,997 to James Economy et al.

In addition to the above-noted references relating to boron nitride fibers, shaped boron nitride, usually nonporous, bodies have also been prepared in the past. Such articles are disclosed, for example, by Taylor, U.S. Pat. No. 2,888,325, which teaches the use of a multiple stage nitriding process comprising intermittent addition of oxygen-containing boron compound at intermediate stages of nitriding, followed by further nitriding.

Furthermore, such articles have been prepared by sintering boron nitride fibers in the presence of boron oxide.

U.S. Pat. No. 4,130,631, assigned to the same assignee as the present application, does disclose a method for producing a non-woven porous boron nitride fiber mat having sufficient strength for use as an electric cell separator in the above mentioned molten lithium chloride environment. However, despite the superior physical characteristics of the resulting product, this method is not sufficiently detailed to insure an economically feasible operation.

Therefore, it is an object of the present invention to provide a totally integrated manufacturing process to produce boron nitride fiber articles starting from the basic boron oxide, and to do so in a commercially feasible manner.

It is a further object of the present invention to adapt techniques from the fiberglass producing art to the economical production of boron nitride articles.

SUMMARY OF THE INVENTION

A process for producing non-woven, boron nitride fiber batts, comprises the steps of melting solid boron oxide and introducing the molten boron oxide into a rapidly spinning drum having a plurality of circumferentially arranged perforations, whereby the molten boron oxide is extruded through the perforations into a plurality of strands. An annular gas stream is directed obliquely against each of the strands to attenuate them into fibers. The fibers are subjected to a turbulent air flow to become randomly oriented and intertwined into a cohesive bundle. Finally the bundle is heated in an anhydrous ammonia atmosphere to a sufficient temperature and for a sufficient time to convert essentially all boron oxide in the fibers into boron nitride.

In a preferred embodiment, the batts comprise staple boron nitride fibers having lengths of from 0.1 inch to 1.0 foot and a maximum diameter of about 10 microns. These batts, after mechanical shaping, can be used as electric cell separators in a lithium-sulfide battery, or can serve as convenient, easy-to-handle sources of boron nitride fibers for other manufacturing processes.

BRIEF DESCRIPTION OF THE DRAWINGS

The several features and advantages of this process for manufacturing boron nitride fiber batts in accordance with the invention, will be more readily understood and appreciated from the following detailed description of the preferred embodiments, as shown in the accompanying drawings in which.

DESCRIPTION OF THE PREFERRED EMBODIMENT

Figure 2:
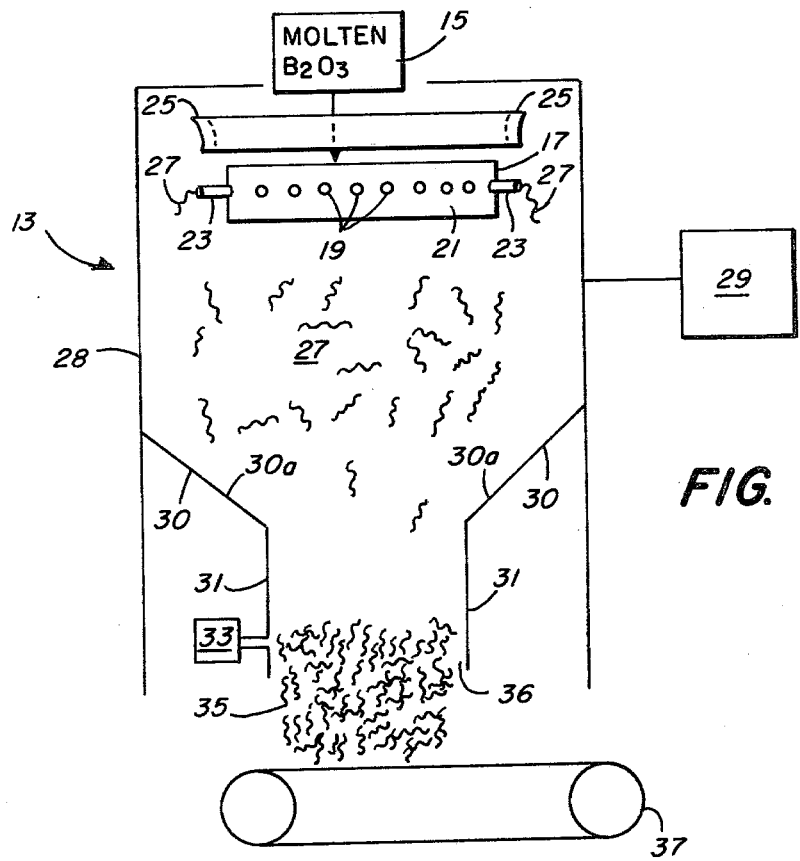
FIG. 2 is a side elevation view, in diagrammatic form, of the boron oxide centrifugal spinning apparatus used to produce boron oxide fibers.
Figure 1:
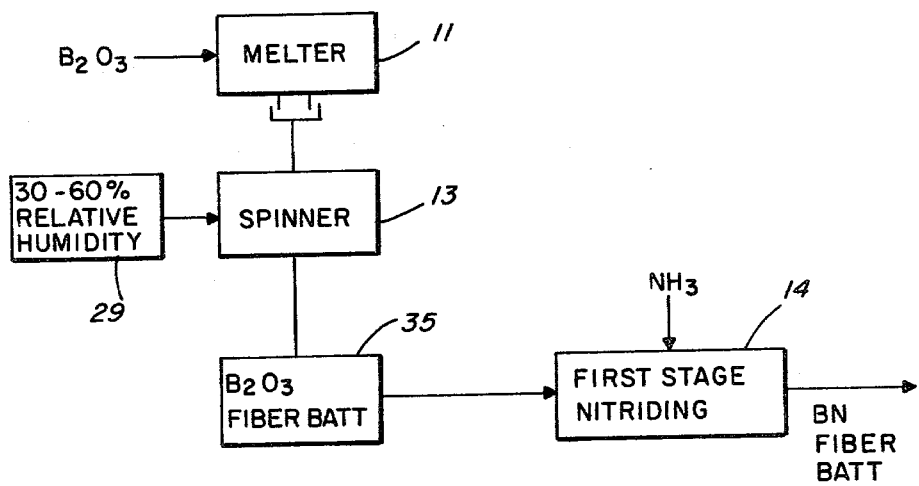
FIG. 1 is a flow diagram of the boron nitride manufacturing process.

Referring now to FIG. 1, the starting point in the boron nitride manufacturing process is the production of the basic boron oxide fibers, utilizing a melter 11 and a spinner apparatus 13. The melter, as its name indicates, raises the temperature of solid boron oxide ($B_2O_3$) crystals above their 460° C. melting point, using any convenient means, and turns them into a molten liquid. The melter generally heats the $B_2O_3$ crystals to a temperature in the range of 600°–1100° C. Referring now to FIG. 2, the molten boron oxide liquid 15 is introduced into a cylindrical drum 17 having a series of orifices 19 arranged at generally equal spacings about the circumference of a vertically extending sidewall 21. A drive motor (not shown) spins the drum containing the molten boron oxide at high speed (1000-3000 RPM), thereby forcing the molten boron oxide centrifugally outward against the inner surface of the sidewall 21 and through the orifices 19. This action produces a series of extruded strands or primary elements 23. An annular orifice 25 with a diameter one inch greater than the drum 17 diameter is disposed about the periphery of the rotating drum 17, generally perpendicular to the direction of extrusion of the strands. A stream of gas, for example, an inert gas, compressed air or combustion gases, emanates from the annular orifice 25 at a temperature in excess of about 700° C. and at a rate of approximately 800 to 900 feet per second, and impinges obliquely on the outward end of the opposing strands 23. The action of the annular gas stream induces a downward velocity and produces an attenuating effect, which thins each of the strands into a fiber of filament 27. This procedure is analogous to processes known in the fiber glass manufacturing art, using apparatus such as those disclosed in U.S. Pat. Nos. 3,014,236 and 3,030,659. Although the proper combination of operating variables such as, for example, rotational speed of the drum and the temperature and rate of gas flow from the annular orifice 25 could produce one continuous boron oxide fiber 27 from each of the strands 23, because of the inherent brittleness of the boron oxide the stream typically produces staple or discretely formed fibers, generally ranging from about 0.1 inch to 1.0 foot in length. Preferably the maximum diameter of the fibers is targeted to be about 10 microns, with 3-7 microns being the optimum diameter range.

An outer housing 28 of the spinner creates a more or less isolated environment in which the extruding and attenuating operations take place. A humidity controller 29 maintains this environment at a relative humidity of about 30-70%, an amount which does not significantly deteriorate the water-soluble boron oxide.

The mass of spun-off fibers 27 falls into the space encompassed by a receptacle 30 whose sloping sides 30a gradually funnel the mass into a chamber 31. An air transvector 33 communicates with the interior of the chamber 31. This transvector provides a high velocity (100-200 feet/sec) stream of air which prevents the fibers from wrapping together to form a "rope". The stream creates a turbulence which violently swirls the fibers to produce random orientation and intertwining of the fibers and an even distribution of the fibers on a collecting screen 37. The density of the compacted fiber mass, or batt, 35 as it exits from a discharge port 36 of the spinner, is typically in the range of from about 0.001 to 0.004 grams per cubic centimeter. The moving collecting screen 37, positioned beneath the discharge port 36, receives the batts. Alternatively, the batts may fall onto a continuously moving conveyor belt or into a collecting bin. In either case, the function of the screen, conveyor belt, or the bin is to allow the batts to be transported to the location of the next step in the process.

Referring again to FIG. 1, the next step in the process in accordance with the present invention, is the nitriding of the boron oxide fiber batts to convert boron oxide in the fibers into boron nitride, indicated in FIG. 1 by the reference numeral 14.

The nitriding phase involves the heating of the batt of boron oxide fibers in an ammonia ($NH_3$) atmosphere, which is free of water vapor, because of the deteriorating effect of water on boron oxide. This exposure of the boron oxide to the ammonia atmosphere produces a reaction according to the general equation: $B_2O_3 + 2NH_3 = 2BN + 3H_2O$. As disclosed in more detail in U.S. Patent No. 3,429,722 to Economy et al. (having a common assignee as the present application, and which is incorporated here by reference), the temperature of the boron oxide is raised from room temperature to a final temperature between about 700° to 1100° C. at a rate of from 5° to 100° C. per hour. The flow of ammonia through the reaction chamber is maintained at 0.01 to 3.3 liter/min./gram of $B_2O_3$ fiber being reacted. Nitriding time may range between 10 hours to 100 hours. As the temperature increases, two intermediate stages of reaction occur. The first reaction which occurs is that of adding a protective shield of a nitrogen and hydrogen containing composition to the outer surface of the $B_2O_3$ fiber. This shield not only retains the fibrous form, but also prevents fusing of the fibers together. Such addition reaction extends from room temperature up to about 250°-300° C. Above about 300° C. and up to about 500° C. the $B_2O_3$ fiber, if having a maximum diameter of not more than about 10 microns, develops a highly porous structure, accompanied by a weight loss and the giving off of water vapor according to the aforesaid general equation. Thus, the $NH_3$ is able to penetrate substantially throughout the thickness of the $B_2O_3$ fiber, allowing the boron, nitrogen, hydrogen and oxygen to react, and begin the formation of various intermediate boron and nitrogen containing compositions. The exact method by which the nitriding is effected is not critical to the present invention, and various alternative methods previously known in the art may yield equally satisfactory results for the present process.

The fully nitrided batts may be shaped, using any conventionally known techniques, into the appropriate configurations to be used, for example, as lithium sulfide battery cell separators. However, they (and even the unnitrided variety) also may serve as an intermediate product, in that their internal cohesiveness makes them easily manageable and transportable sources of raw material for manufacturing processes requiring boron nitride (or boron oxide) fibers. A particularly suitable application is disclosed in a co-pending U.S. patent application Ser. No. 134,903, filed on even date herewith by the same inventors for process for manufacturing boron nitride fiber felt using a fourdrinier machine, the teachings of which are incorporated herein by reference. There, quantities of BN and $B_2O_3$ fibers are blended with a non-aqueous liquid medium to form a homogeneous slurry, which is processed through a Fourdrinier machine into a coherent boron oxide-bonded felt. The felt can be converted into the more durable boron nitride-bonded felt by sufficiently heating it in an anhydrous ammonia atmosphere.

Although the foregoing disclosure illustrates the advantages and features of the novel manufacturing process in accordance with the present invention, it may be obvious to those skilled in the art to effect various modifications or changes to the present invention, without departing from the spirit thereof. The scope of the present invention is to be determined by the following claims.

We claim:

1. A process for producing non-woven, internally cohesive, boron nitride fiber batts, comprising the steps of:

melting solid boron oxide;

extruding the molten boron oxide from a rapidly spinning drum having a plurality of circumferentially arranged perforations, whereby said molten boron oxide is extruded through said perforations into a plurality of strands;

directing an annular gas stream at a temperature in excess of 700° C. obliquely against each of said strands to attenuate said strands into fibers said temperature being of an intensity and duration to cause the fibers to become sticky and bond together;

subjecting said fibers to a turbulent air flow sufficient to cause random orientations and intertwining of the fibers;

collecting said fibers into a bundle; and heating said bundle in an anhydrous ammonia atmosphere to a sufficient temperature and for a sufficient time to convert essentially all boron oxide in the fibers into boron nitride.

2. The process as set forth in claim 1, wherein said gas stream is a stream of compressed air.

3. The process as set forth in claim 1, wherein said gas stream is a stream of combustion gases.

4. The process as set forth in claim 1, wherein said gas stream is a stream of an inert gas.

5. The process as set forth in claim 1, wherein said gas stream has a speed of from about 800 to about 900 feet per second.

6. The process as set forth in claim 1, wherein said drum is spinning at a speed of from 1000 to 3000 RPM.

7. The process as set forth in claim 1, wherein said fibers are discrete having lengths of from about 0.1 inch to about 1.0 foot.

8. The process as set forth in claim 2, wherein said sufficient temperature to convert boron oxide in the fibers into boron nitride is from about 700° C. to about 1100° C. and said sufficient time to convert the boron oxide fibers to boron nitride is from about 10 to about 100 hours.

* * * * *